United States Patent Office 3,117,939
Patented Jan. 14, 1964

3,117,939
HYDROGENATION CATALYSTS
Harvey D. Royce, New Orleans, La., assignor to Wesson Oil & Snowdrift Co., Inc., New Orleans, La., a corporation of Louisiana
No Drawing. Filed Jan. 25, 1960, Ser. No. 4,227
1 Claim. (Cl. 252—443)

This invention relates to improved nickel hydrogenation catalysts, and more particularly to the preparation of highly active and selective catalysts for use in hardening unsaturated glyceride oils, and for the hydrogenation of carbon to carbon double bonds in organic compounds.

It is well known that copper lowers the reduction temperature of nickel catalysts, thus promoting the activity and selectivity. An ordinary nickel catalyst is made by reducing a nickel salt at a temperature not lower than about 350° C. By mixing the nickel salt with a copper salt and coprecipitating, the nickel salt is reduced to nickel at temperatures of which the lowest limit is about 180° C.

However, copper is an objectionable constituent of edible oil hydrogenation catalysts because of its powerful pro-oxidant action in accelerating oxidative rancidity. It has been found that as little as 0.1 p.p.m. copper can induce a measurable decrease in the induction period of cottonseed oil.

An object of this invention is to obviate the use of copper to lower the catalyst reduction temperature.

It is known, as shown in the Dewar Patent No. 1,268,692, that a mixture of a nickel salt with a silver salt can be reduced to the dry state at a temperature of about 200° C. to 210° C. with hydrogen practically completely in two hours. The reduction can be made as low as 185° C. but the activity of the catalyst is poor. The reduction can also be done in admixture with oils but at considerably higher temperatures, as shown in Dewar Patent No. 1,275,405.

Another object of this invention is to provide a promoted nickel catalyst which lowers the reduction temperature more effectively than silver or copper, and results in an active catalyst that has been found to have good selectivity and other properties that render it particularly suited for the partial hydrogenation of liquid glyceride oils to plastic shortening and margarine oils.

It is also an object to lower the reduction temperature of a promoted nickel catalyst to a point where wet reduction in an oil medium is practical.

These and other objects and advantages can be accomplished by co-precipitating soluble salts of nickel, silver and zirconium from a solution with a soluble basic compound, such as an alkali or alkaline earth metal carbonate or hydroxide to form an intimate mixture of the basic compounds of the metals. This mixture can then be washed, dried, ground and reduced with hydrogen or it can be mixed with an oil and then reduced in the wet condition.

The proportion of nickel, silver and zirconium can be varied quite widely and other metals such as aluminum, silicon and chromium can be present without deleterious effect of the catalyst action. Aluminum particularly appears to increase the activity.

For best results the zirconium should be present in the mixture in above 15 percent and preferably from 20 percent to about 45 percent. The nickel is present in major amount in the composition, such as from 55 percent to 75 percent, and the silver is in relatively small amount such as from 5 percent to about 25 percent. Aluminum and other metals can be present in minor amount such as 4 percent and lower.

Some of the better compositions consisting essentially of nickel, silver and zirconium salts were reduced successfully at as low as 135° C. by dry reduction, and down to 170° C. by wet reduction.

The beneficial action of the silver lowering the reduction temperature is believed to depend partly on intimate co-precipitation of silver with nickel and zirconium whereby the property of silver salts to reduce easily at low temperatures catalysts the reduction of the nickel and the zirconium, but apparently the zirconium also has some unknown effect since its presence brings about a much lower reduction temperature than with silver alone. This was completely unexpected to applicant because zirconium and nickel combinations without the silver require a higher reduction temperature than straight nickel. In other words, zirconium raises the reduction temperature of the straight nickel salts but in combination with silver it lowers the reduction temperature even more than is attained by the combination consisting of nickel and silver.

The following typical examples illustrate suitable methods for practicing this invention.

EXAMPLE I

A solution containing 31 grams of zirconium sulphate in 280 grams of water was added slowly while stirring to 2 liters of an 8 percent $Na_2CO_3$ solution. The resulting clear solution was heated to 75° C. and one liter of a solution containing 300 grams of hydrated nickel nitrate and 12 grams of silver nitrate was added slowly, at a rate of about 10 milliliters per minute, while stirring vigorously. The resulting precipitate was digested hot for 40 minutes, then filtered under suction and washed until practically free from soluble nitrates. The filter cake was dried in a 140° C. oven and then ground to pass 100 mesh.

One hundred grams of the powder was reduced dry under an atmosphere of hydrogen in a rotary furnace at 175–185° C. for 3 hours, yielding 46 grams of a black magnetic powder, which was cooled under nitrogen and quenched with 100 grams of cottonseed oil to protect it from oxidation. The reduced catalyst powder contained nickel, zirconium, and silver in the ratio of 78 to 12 to 10, and will be designated as NZS–1.

The activity and selectivity of this catalyst (NZS–1) were evaluated against a commercial nickel catalyst, made by wet reduction of nickel formate, as follows. A charge of catalyst equivalent to 0.1 percent nickel, and 0.4 percent kieselguhr, were added to 1400 grams of a 65–35 mixture of soy and cottonseed oils in a laboratory hydrogenator equipped with a high speed agitator, $H_2$ inlet, and heating and cooling coils. Hydrogenation was conducted at 135° C. and atmospheric pressure until the iodine value of the oil had dropped from an initial value of 123 to 80 I.V., at which point the hardened oil had the proper plastic consistency for formulating into shortening. The hydrogenation time required to reduce the I.V. from 123 to 80 under these standard conditions is a measure of the activity of the catalyst. The selectivity of a catalyst may be defined as its ability to produce a shortening having a relatively low iso-oleic acid content, and low saturated acid content, for a given I.V. (80), and these levels can be estimated closely from the melting point and the consistency of the product. In general, a low melting point and a soft consistency indicate good selectivity.

The Ag-Zr promoted nickel catalyst of Example I, when tested as above, had a hydrogenation time of 43 minutes and the 80 I.V. product had a Wiley melting point of 31.0° C. and a consistency (60° F. Scoco needle penetration) of 108, compared to 45 minutes hydrogenation time, 35.0 melting point, and 78 consistency for the product hydrogenated with the commercial reduced nickel formate catalyst described above.

The Scoco 60° F. needle penetration method is described in my earlier Patent No. 2,671,097, and since the consistency value is the depth of penetration of a standard needle into the fat at 60° F., the higher the numerical consistency value, the softer the fat. The Wiley melting point method is a standard procedure described in the American Oil Chemists Society Methods Book.

Thus, a survey of the above hydrogenation data shows that the silver-zirconium promoted nickel catalyst NZS-1 was slightly more active than the commercial catalyst, and much more selective. Moreover, the silver promoted catalyst of this invention filtered cleaner and faster from the hydrogenated oil, which is a desirable quality in commercial operations.

Another 100 gram portion of the promoted nickel catalyst NZS-1 (before reduction) was suspended in 200 grams of cottonseed oil and reduced wet by bubbling $H_2$ through the suspension under violent agitation for 2 hours at 240° C. The reduced catalyst, NZS-1W, was more active than the dry catalyst NZS-1, lowering the I.V. of the soy-cotton oil mixture from 123 to 80 in 41 minutes, but it was not quite as selective, giving a 33° C. melting point and 86 consistency at 80 I.V.

Additional examples of the practice of this invention are outlined in the following table. The same general procedure used in Example 1 for precipitation, washing, drying, reduction, and evaluation of activity and selectivity was used in preparing and testing the catalysts in Table 1 and Table 2.

*Table 1*

THE EFFECT OF COPPER, SILVER AND SILVER-ZIRCONIUM ON THE REDUCTION TEMPERATURE OF NICKEL HYDROGENATION CATALYSTS

| Catalyst No. | Metal Content and Ratio | Reduction Conditions | | |
|---|---|---|---|---|
| | | Method | Temp., ° C. | Time, Hrs. |
| A | Ni (Control) 100, No Ag | Dry | 350 | 2 |
| | | Wet | Not reducible below 250° C. | |
| B | Ni-Cu 80-20 | Dry | 180 | 2 |
| | | Wet | 220 | 2 |
| C | Ni-Ag 90-10 | Dry | 185 | 3 |
| | | Wet | 220 | 3 |
| D | Ni-Ag-Zr 67-10-23 | Dry | 150 | 3 |
| | | Wet | 170 | 3 |
| E | Ni-Ag-Zr-Al 76-10-11-3 | Dry | 195 | 3 |
| | | Wet | 240 | 2 |

*Table 2*

THE EFFECT OF COPPER, SILVER AND SILVER-ZIRCONIUM ON THE ACTIVITY AND SELECTIVITY OF NICKEL HYDROGENATION CATALYSTS

| Catalyst No. | Metal Content and Ratio | Hydrogenation of 65-35 Soy-Cotton Oil to 80 I.V. at 135° C., 0.1— Nickel Atmospheric Pressure. | | |
|---|---|---|---|---|
| | | Hydrogenation Time, Min. | Wiley M.P., ° C. | Consistency (Scoco 60° F. Needle Penetration) |
| A | Ni (Control) 100, No Ag | 45 AA | 34 AS | 70 |
| B | Ni-Cu 80-20 | 34 GA / GA | 35 PS / PS | 58 |
| C | Ni-Ag 90-10 | 63 PA / 33 GA | 32 GS / 34 FS | 98 / 84 |
| D | Ni-Ag-Zr 67-10-23 | 35 GA / 35 GA | 32 GS | 90 |
| E | Ni-Ag-Zr-Al 76-10-11-3 | 37 GA / 31 EA | 32 AS / 34 AS | 70 / 77 |

KEY.—AA=Average Activity. PA=Poor Activity. GA=Good Activity. EA=Excellent Activity. AS=Average Selectivity. PS=Poor Selectivity. GS=Good Selectivity. FS=Fair Selectivity. ES=Excellent Selectivity.

Catalyst A (control) was a basic nickel carbonate, unpromoted, and required a dry reduction temperature of 350° C. By co-precipitating 10 parts of Ag with 90 parts of nickel from their nitrate solutions with sodium carbonate the dry reduction temperature is lowered to 185° C., and wet reduction proceeds smoothly at 220° C.

The lowest reduction temperature achieved in this invention was 150° C. in the dry reduction of catalyst E, a blend of Ni-Ag-Zr in the ratio 67-10-23. Heretofore the lowest reduction temperature known for nickel carbonate was 180° C. in the wet reduction of copper promoted basic nickel carbonate. Thus, by the herein disclosed methods of co-precipitating Ag-Zr and Ni, and Ni-Ag-Zr plus minor proportions of promoter metals such as Al, Cr, Si, and B, new areas in the field of preparation of nickel hydrogenation catalysts have been disclosed.

This invention affords a practical process of reducing nickel catalysts in the temperature range of commercial glyceride oil hydrogenation practice; namely 150 to 200° C., now making it possible to carry out the reduction and oil hydrogenation processes in one operation in the same apparatus. Heretofore the common practice in the art was to dry reduce nickel catalysts in electric or gas heated furnaces at high temperature, in the range 340° to 500° C., or to wet reduce in oil at 220° to 260° C., in which range the reduction oil is broken down by the heat and reduction by-products to a condition where it is generally filtered off and washed out of the catalyst before using the nickel for edible oil hydrogenation. While it is true that copper promoted nickel catalysts can be reduced wet at 180° C., copper is an undesirable constituent of catalysts intended for edible oil hydrogenation, because minute traces of this metal will accelerate oxidation and the development of rancidity. Whereas as little as 0.1 p.p.m. of copper can induce a measurable decrease in the induction period of cottonseed oil, no decrease can be detected in any catalyst compositions consisting essentially of nickel, silver and zirconium even with silver or zirconium present at a 1.0 p.p.m.

While a preferred embodiment of this invention has been described, it is apparent that variations within the generic disclosure are possible, and these are intended to be included, limited only by the scope of the claim.

I claim:

A composition suitable for reduction with hydrogen at a relatively low temperature to provide a catalyst for use in the catalytic hydrogenation of carbon double bonds, said composition consisting essentially of a mixture of basic compounds selected from the group consisting of basic carbonates and hydroxides of nickel, silver and zirconium in which the nickel is present in major amount of from approximately 55 to 75 percent by weight of the total metal content, the silver present in minor amount of from approximately 5 to 25 percent by weight of the total metal content, and the zirconium in minor amount of from approximately 15 to 45 percent by weight of the total metal content.

References Cited in the file of this patent

UNITED STATES PATENTS

| | | |
|---|---|---|
| 1,268,692 | Dewar et al. | June 4, 1918 |
| 1,275,405 | Dewar et al. | Aug. 13, 1918 |
| 1,335,161 | Ellis | Mar. 30, 1920 |
| 1,548,872 | Ellis | Aug. 11, 1925 |
| 2,357,352 | Paterson | Sept. 5, 1944 |
| 2,520,440 | Sanders | Aug. 29, 1950 |
| 2,697,066 | Sieg | Dec. 14, 1954 |

UNITED STATES PATENT OFFICE
CERTIFICATE OF CORRECTION

Patent No. 3,117,939 January 14, 1964

Harvey D. Royce

It is hereby certified that error appears in the above numbered patent requiring correction and that the said Letters Patent should read as corrected below.

Column 4, line 47, after "carbon" insert -- to carbon --.

Signed and sealed this 2nd day of June 1964.

(SEAL)
Attest:

ERNEST W. SWIDER
Attesting Officer

EDWARD J. BRENNER
Commissioner of Patents